June 19, 1934.  E. R. WOLFERT  1,963,186
VOLTAGE COMPENSATOR
Filed March 1, 1933  2 Sheets-Sheet 1
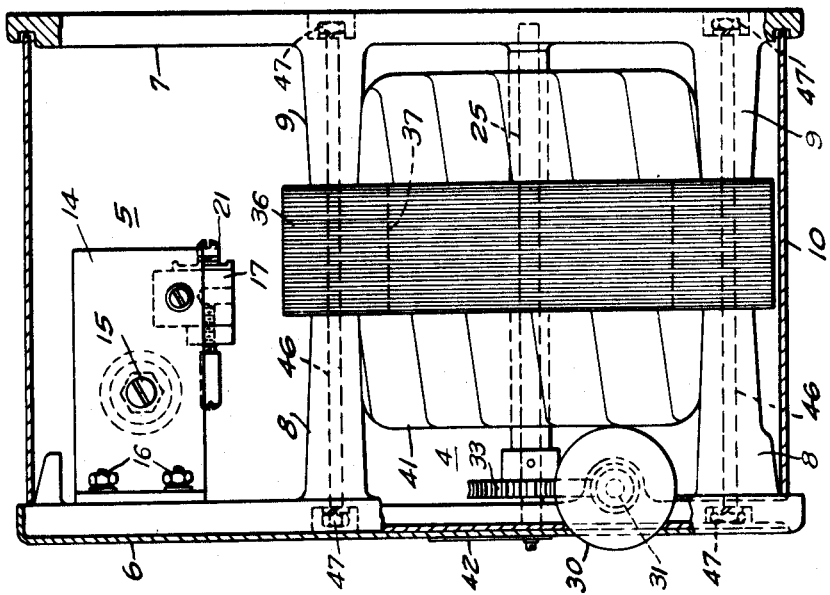
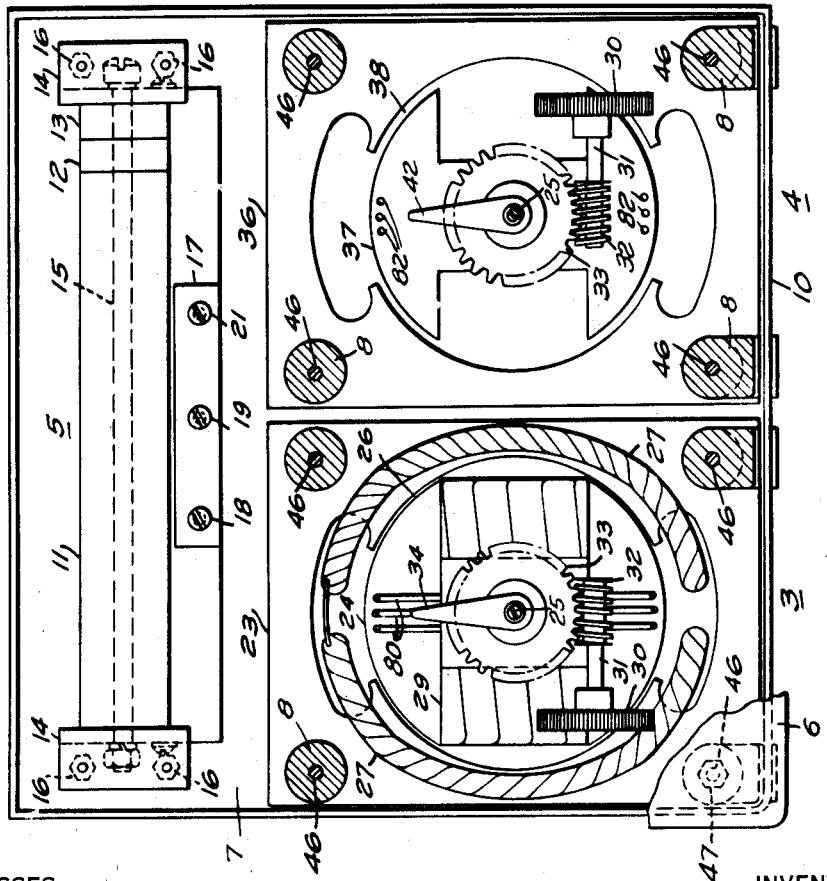
WITNESSES:
INVENTOR
Edward R. Wolfert
BY
Franklin E. Hardy
ATTORNEY June 19, 1934.      E. R. WOLFERT      1,963,186
VOLTAGE COMPENSATOR
Filed March 1, 1933      2 Sheets-Sheet 2
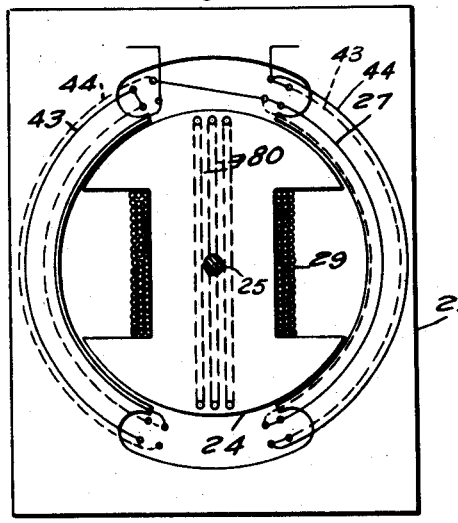
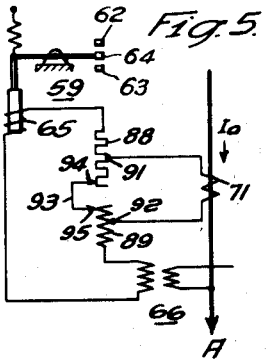
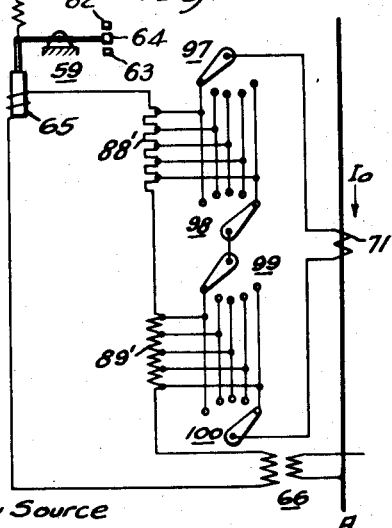
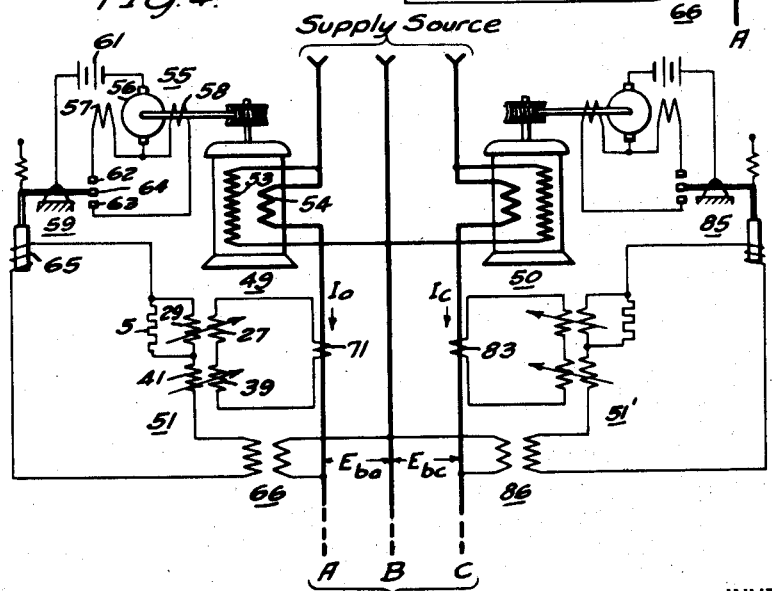
WITNESSES:
INVENTOR
Edward R. Wolfert.
BY
Franklin E. Hardy
ATTORNEY Patented June 19, 1934

1,963,186

UNITED STATES PATENT OFFICE 1,963,186

VOLTAGE COMPENSATOR

Edward R. Wolfert, Wilkinsburg, Pa., assignor to Westinghouse Electric & Manufacturing Company, East Pittsburgh, Pa., a corporation of Pennsylvania Application March 1, 1933, Serial No. 659,163

18 Claims. (Cl. 171—119)

My invention relates to compensating devices and it has particular relation to line drop compensators for automatic voltage regulators.

When it is desired to energize an electro-responsive device, such as a voltmeter or regulator, in accordance with the voltage at a point in an electrical circuit remote from that to which it is connected, it is necessary to compensate the energization of the device in accordance with the voltage drop in the line caused by the resistance and reactance of the circuit.

In practice, this compensation is obtained through the utilization of a line-drop compensator which introduces into the energizing circuit of the electro-responsive device a voltage that is proportional to and in effective phase coincidence with the voltage drop through the circuit impedance. In effect, therefore, the compensator reproduces in the energizing circuit of the electro-responsive device the electrical characteristics of the circuit itself, though usually in a much smaller degree.

A line-drop compensator, in general, comprises a resistance element and a reactance element through which elements is circulated a current that is proportional to the current in the main circuit. The voltage drops of these two elements, which respectively simulate the drops through the resistance and reactance components of circuit impedance, will thus increase as the load on the circuit increases and decrease with a reduction in the load, thereby automatically compensating for the voltage drop in the circuit for all loads.

In a recently devised compensating system for open-delta connected regulators utilized in three-phase circuits, which system is more completely described in a copending application, Serial No. 659,119 by Charles F. Wagner, filed March 1, 1933, and assigned to the same assignee as this invention, each compensator is directly energized from the current in the regulator-connected line, which, at unity power factor, is displaced by 30° from the line-to-line voltage utilized to energize the electro-responsive device which controls the operation of the regulator. By virtue of a special setting of the resistance and reactance elements of each compensator whereby the phase angle of compensator impedance appropriately differs from the phase angle of compensated circuit impedance by 30°, the error which would otherwise be introduced by the displacement of the compensator energizing current from the line-to-line voltage of the circuit which energizes the associated electro-responsive device is eliminated.

For certain values of phase angle of the impedance of the compensated circuit, this special setting requires that negative values of compensator resistance or reactance be provided. All compensators known in the art today with which I am familiar are capable of a continuous adjustment only through the range of positive component values. My invention is directed to improved designs of compensators which are inherently capable of adjustment through both positive and negative values of resistance and reactance components.

A major object of my invention, therefore, is to provide a line-drop compensating device the adjustment range of which may be extended below zero to include negative component values.

Another object of my invention is to provide a compensator of the above indicated character that shall be compact, efficient, reliable in operation and easily manufactured.

A further object of my invention is to provide a compensator of the above indicated character in which the variations in component adjustment are infinitely small.

In a preferred embodiment of my invention, I extend the principle of magnetic induction, more completely explained in U. S. Patent 1,858,845, issued May 17, 1932 to E. R. Wolfert and assigned to the Westinghouse Electric and Manufacturing Company, to secure the variations in compensation through both the positive and negative component value ranges. In another embodiment of my invention, which, while not capable of such fine regulation, is in many applications satisfactory, I also apply the negative-range principle to compensators employing tapped windings.

My invention will best be understood from the following description of specific embodiments thereof when taken in conjunction with the accompanying drawings, in which Figure 1 is a view in front elevation of a compensator of the rotary contactless type constructed in accordance with my invention, a portion of the frame work and the windings of one variable inductance device being removed.

Fig. 2 is a side elevational view of the embodiment of my invention illustrated in Fig. 1, Fig. 3 is a diagrammatic view showing the arrangement of the core and windings of the compensator of Figs. 1 and 2, Fig. 4 is a diagrammatic view of apparatus and circuits employed in an application of the compensator of Figs. 1, 2 and 3 to an induction regulator, Fig. 5 is a diagrammatic view of a compensator employing a tapped resistor and reactor winding arranged in accordance with a second embodiment of my invention, and Fig. 6 is a similar diagrammatic view of a tapped winding compensator showing a special arrangement of tap switches utilized thereby.

Referring to the drawings, the rotary contactless compensator illustrated in Figs. 1, 2 and 3 comprises, in general, a framework having two variable induction devices 3 and 4 and a resistor 5 disposed therein. The framework consists of a front wall member 6 and a rear wall member 7 having lateral projections 8 and 9, respectively, extending inwardly therefrom. A screen 10 is disposed around the framework to protect the interior of the compensator.

The resistor 5 is divided into a plurality of sections 11, 12 and 13 and is secured at the ends thereof to brackets 14 by a rod 15 extending longitudinally therethrough. The brackets 14 are secured to the front wall member 6 by bolts 16 and extend inwardly therefrom holding the resistor in the proper spaced relation to the framework. A terminal block 17, having studs 18, 19 and 21 to which the ends of the sections 11, 12 and 13 are respectively connected, is provided. The sections 12 and 13 of the resistor 5 are relatively small as compared to the main section 11 thereof and are provided to permit application of the compensator to regulator systems having potential transformers of different ratios.

The variable induction device 3 employed to compensate for the ohmic voltage drop comprises a laminated magnetizable core of substantially rectangular shape consisting of a stator 23 and a movable member 24 mounted within the stator on a shaft 25 that is supported at each end by the wall members 6 and 7. A primary winding 27 is shown as being wound on the stator 23, and a secondary winding 29 on the rotor 24. It will be understood, however, that if desired the rotor winding may be used as the primary and the stator winding as the secondary.

The stator 23 and the movable member 24 are separated by a relatively small air gap 26. The secondary winding 29, carried on the movable member 24 in inductive relation to the winding 27, is connected in parallel circuit relation to the resistor 5. The winding 29 preferably comprises more turns than does stator winding 27 in order to increase the induced voltage in winding 29 over that impressed upon the primary winding 27.

With the very narrow air gap 26 between the movable and stationary members of the core, the electrical characteristics of the variable inductance device 3 are similar to those of a current transformer having variable primary and secondary turns. Relatively little magnetizing current being required, the voltage induced in the secondary winding 29 will be substantially in phase with the primary winding energizing current when the windings are coupled in one way, and 180° out of phase therewith when the coupling is reversed. The secondary winding being closed through the resistor 5, a current will flow therein which is in phase with the secondary induced voltage, the voltage drop across the resistor 5 being in phase with this current.

To the end that the movable member 24 may be rotated with respect to the stator 23 to control the direction and magnitude of the resistor voltage drop, I provide a knob 30 mounted on a shaft 31 that turns a worm gear 32 which engages a gear wheel 33 mounted on the main rotor shaft 25. An indicating arm 34 carried by this shaft is utilized to indicate on a scale (not shown) the different values of resistance, both positive and negative, for which the compensator element 3 is designed.

When the rotor 24 occupies the position illustrated in Figs. 1 and 3, in which the plane of the secondary winding 29 carried thereby is at right angles to the plane of the primary winding 27 carried by the core stator 23, the magnetic coupling between the two windings is substantially zero and no voltage is induced in the secondary winding. For this zero setting of the compensator element, no voltage drop will appear across resistor 5.

Rotation of the rotor in a clockwise direction, for example, moves the secondary winding 29 into a position in which there will be induced in it a voltage which is in phase with the current flowing in primary winding 27. This voltage sets up in resistor 5, a potential drop which may be designated as positive. The magnitude of this drop is directly dependent upon the value of the secondary winding voltage, which voltage increases as the rotor is caused to approach the position in which the secondary winding plane coincides with the plane of the primary winding. For this condition, the resistor drop is, of course, maximum.

Similarly, a movement of the rotor 24 from the zero coupling position in the opposite or counterclockwise direction causes to be induced in winding 29 a potential which is displaced by 180° from the primary winding current. This potential sets up in resistor 5 a voltage drop which may be designated as negative, the magnitude being a function of the rotor position as before explained.

In general construction, the variable inductance device 4 employed to compensate for the reactive voltage drop is similar to device 3 already described, it comprising a laminated core consisting of a stator 36 and an interiorly disposed rotatable member 37. The stator 36 and rotor 37 are separated by an air gap 38 that is considerably wider than the air gap 36.

A primary winding 39 (not illustrated in Fig. 1 but diagrammatically indicated in Fig. 4) is disposed on the stator 36 and connected in series circuit relation with the primary winding 27 of the variable inductance device 3. A secondary winding 41, also preferably having a greater number of turns than winding 29, is disposed on the movable member 37 and is connected in series circuit relation with the winding 29. An indicating arm 42 carried by the rotor shaft indicates the different values of reactance, both positive and negative, for which the compensator is designed.

The air gap 38 separating the two core members of device 4 being relatively large introduces a correspondingly large value of air gap reluctance which, in turn, necessitates a large magnetizing current. Because of this predominating magnetizing current, the induced voltage in secondary winding 41 carried by the rotor will be displaced substantially 90 electrical degrees from the energizing current of primary winding 39 carried by the stator.

When the rotor or secondary winding occupies a position in which its plane is at right angles to the plane of the stator or primary winding, no voltage will be induced in it. This position, therefore, corresponds to the zero reactance setting of device 4. Movement of the rotor in one direction from this neutral or zero position will cause the secondary voltage to lag by 90° the primary winding energizing current, and thus, in effect, provide compensation for positive reactance values while a movement of the rotor in the opposite direction from the neutral position reverses the voltage induced in the secondary winding carried thereby causing it to lead the primary winding energizing current by 90° and thus simulate negative values of reactance.

The arrangement of the primary and secondary windings on the core members of each of devices 3 and 4 is more clearly shown in Fig. 3, which is a section through the resistance element device (3) of the compensator. As there illustrated, the primary winding 27 is divided into two similar sections carried, respectively, by the right and left-hand sides of the stator 23 and connected in series circuit relation, portions of the stator punchings being cut away at the top and at the bottom to permit the winding to extend from the front to the rear. In Fig. 3, the heavy lines 43 represent the portions of turns of the winding 27 on the front of the stator 23 and the dotted lines 44 represent the portions of the turns on the rear of the stator.

To accommodate the secondary winding 29 carried by the rotor, a wide slot is made in both sides of the rotor structure 24 and the turns of the winding are wound in this slot, as illustrated. It will be understood that only a few turns of each winding are shown in Fig. 3 and that while I have illustrated a preferred arrangement of the winding and shape of the punchings for the stator and rotor that other forms may also be employed.

The windings on the variable inductance device 4 being arranged in a manner similar to that described in connection with device 3, no separate detailed description or showing of them is deemed necessary.

As before pointed out in connection with device 3, the rotor winding of device 4 may if desired be utilized as the primary and the stator winding the secondary, such an arrangement also providing the necessary adjustable and reversible coupling feature.

The variable inductance devices 3 and 4 are disposed adjacently in the framework of the compensator, the stator members 23 and 36 extending between and engaging the lateral projections 8 and 9. Rods 46 threaded at both ends extend through each of the lateral projections 8 and 9 and the four corners of the stator members 23 and 36, each rod being provided with nuts 47 at its ends which fit into recesses in the wall members and upon being turned down, rigidly clamp the wall members and the stator members together, thereby forming a compact structure.

As has been pointed out, when the rotor member of each of the compensator elements occupies the neutral position in which the plane of the secondary winding carried thereby is at right angles to the plane of the primary winding carried by the stator, the induction coupling between the two windings is zero. For this condition, the energizing current flowing through the primary winding may cause to be set up therein an excessive voltage drop which in many cases may cause the winding burden to be undesirably high or may, due to the intense flux, produce noise in the form of an objectionably loud hum. To overcome these disadvantages at the zero setting condition, I contemplate the provision of an auxiliary short circuited winding carried by the rotor, this winding being so positioned that its plane will coincide with that of the primary winding when the rotor occupies the zero setting position.

In Figs. 1 and 3 this auxiliary winding is illustrated as comprising a plurality of turns 80 which encircle the rotor at a position displaced 90° from that of the main secondary winding 29. These short circuited turns provide an artificial burden for the primary winding when rotated into the position illustrated, they thus acting to effectively limit the core flux intensity and the winding voltage drop.

The reactor element 4 of the compensator is similarly provided with an auxiliary shortcircuited winding, the turns of which are inserted through the holes 82 in the core punchings of rotor element 37.

My compensator has particular application to induction regulators and I have elected to illustrate it in application thereto. It will, however, be obvious that it also has application wherever compensation for line drop is desired, as for example in remote metering and other comparable control systems.

In Fig. 4, I have illustrated two voltage regulators 49 and 50 of a well known induction type disposed in open delta relation in a three-phase circuit comprising conductors A, B and C. It is for applications of this type that the compensating system described in copending application Serial No. 659,119 is intended. In the control circuit of each regulator, I have diagrammatically illustrated at 51 and 51' the improved rotary-contactless compensator of my invention. These compensators are for the purpose of enabling the voltage regulators 49 and 50 to maintain constant at some distant center of distribution the voltage of the power circuit.

Regulator 49, to which regulator 50 is similar, comprises a primary winding 53 connected between circuit conductors A and B and a secondary winding 54 connected in series circuit relation with conductor A for the purpose of introducing corrective voltages therein. For the purpose of changing the relative positions of the primary and secondary windings of the regulator 49, an operating motor 55 is provided. The motor comprises an armature winding 56 and differentially related series field windings 57 and 58. A primary relay or contact making voltmeter 59 is provided for controlling the operation of the motor by connecting it to a source of energy such as a battery 61 to thereby control the regulator 49.

The contact making voltmeter 59 comprises fixed contact members 62 and 63 and a movable contact member 64 adapted to selectively engage the fixed members upon actuation in accordance with the voltage impressed upon an operating winding 65 thereof. When the voltage impressed upon winding 65 falls below a given value, an energizing circuit for motor 55 will be completed which causes it to operate regulator 49 in the voltage-raising direction; while when the voltage similarly rises above the same given value, a second energizing circuit for the motor is completed to operate the regulator in the opposite or voltage-lowering direction.

To influence the primary relay 59 in accordance with the line-to-line voltage of the regulator circuit, it is energized by voltage $E_{ba}$ through a suitable potential transformer 66.

The before-mentioned compensating device shown at 51 is connected between the voltage transformer 66 and the primary relay winding 65 in a manner to introduce into this relay energizing circuit a potential which will compensate for the impedance drop in that portion of the power circuit between the regulators and the distant center of distribution at which it is desired that the voltage be held constant. The secondary windings 29 and 41 of the resistance and reactance elements of the compensator are connected directly in the relay winding circuit in the manner shown, winding 29 being shunted by the resistor 5 as has been explained. The primary windings 27 and 39 of the two compensator elements are series connected in a circuit which is energized through a current transformer 71 by the current $I_a$ flowing in main circuit conductor A.

In a similar manner, the primary windings of the compensator 51' utilized with regulator 50 are energized, through a current transformer 83, by the current $I_c$ flowing in main circuit conductor C, the secondary windings of the compensator being connected in the energizing circuit of primary relay 85 which is acted upon by voltage $E_{bc}$ supplied thereto through a potential transformer 86.

The circuit line currents $I_a$ and $I_c$ which energize the compensators being displaced by 30° from the associated line-to-line voltage $E_{ba}$ and $E_{bc}$ which supply the primary relay energizing circuits of the two regulators 49 and 50, special settings of the compensator elements are required to effect proper results. As is further explained in that application, under certain conditions of phase angle of circuit impedance these settings must be made in the negative range of compensation values. Whereas, the usual type of compensators heretofore known in the art require a reversal of element connections to effect the negative settings required in the application under consideration, the improved compensator of my invention which has just been described is inherently capable of providing them and is for this reason of superior utility.

The operation of the compensating system illustrated in Fig. 4 is as follows. The movable members 24 and 37 of the variable inductance devices 3 and 4 comprised by each of the compensators 51 and 51' are adjusted until the voltage drop across the resistor 5 bears the proper ratio to the ohmic voltage drop in the circuit and the voltage drop across the variable inductance device 4 bears the necessary ratio to the reactive voltage drop in the circuit. Each of these compensator element voltage drops may be either positive or negative, as explained, in the copending application referred to.

The variable inductance devices 3 and 4 of each compensator, being energized by a current proportional to the circuit load current, will introduce voltage components into the circuit of the operating winding of the primary relay that will increase for an increase in load and decrease for a decrease in load on the circuit.

When there is no load on the circuit, the full voltage of the potential transformer is impressed upon the primary relay and the regulator is actuated in the one direction or the other to maintain a constant and predetermined voltage across the relay. At this voltage the movable contact member of the relay is in the neutral or disengaged position shown.

When there is load on the circuit A—B—C, the line current sets up in the compensator elements voltage drops which are subtracted vectorially from the voltage of the potential transformer and as the primary relay requires a constant voltage to maintain it in a balanced position, it will cause the regulator to increase the voltage of the relay until the difference between the potential transformer voltage and the compensator element drops are the same as before.

It will be understood that the operation of regulator 50 is exactly the same as that of regulator 49, the control circuits of the two regulators being so matched that similar and simultaneous operation thereof will be effected.

The description thus far has been directed to a compensator of the rotary contactless type which is capable of providing both positive and negative values of resistance and reactance components. My invention additionally contemplates the modification of the older type of compensators involving tapped resistor and reactor windings to provide the negative value components in addition to the usual positive ones. A compensator of this type modified in accordance with my invention is shown in Fig. 5.

In Fig. 5, I have illustrated one conductor A of the three-phase circuit shown in Fig. 4 and the primary relay 59 utilized to control induction regulator 49. Intermediate the operating winding 65 of this relay and the potential transformer 66 which supplies the operating winding circuit, I have shown a compensator comprising a tapped resistor 88 and a tapped inductor 89. The current transformer 71 acted upon by current $I_a$ connects to the midpoints 91 and 92 of the two windings named, the circuit of its secondary winding being completed through a conductor 93 which connects together winding taps 94 and 95.

When the two taps connect windings 88 and 89 at the adjacent ends thereof in the manner shown, the voltage drop components introduced into the energizing circuit of primary relay winding 65 may be assumed to be of the usual or positive values. A movement of tap 94 upwardly along resistor 88 decreases the magnitude of voltage drop introduced by the resistor reducing it to zero when the tap reaches the midpoint 91 of the resistor.

Further movement in the upward direction of the tap 94 reverses the direction of voltage drop introduced by resistor 88, imparting to it what may be termed a negative characteristic. The magnitude of this negative voltage drop increases as the tap 94 is further moved to approach the upper end of resistor 88.

In a similar manner as tap connection 95 is moved downwardly along reactor winding 89, the magnitude of the positive voltage drop introduced by this winding into the energizing circuit of relay winding 65 is reduced, it becoming zero when the tap reaches the midpoint 92. Further downward movement of the tap connection reverses the value of the voltage drop imparting to it a negative characteristic. As the tap 95 is further moved toward the lower end of reactor winding 89, the voltage drop supplied by the winding approaches its maximum value in the negative direction.

In the showing of Fig. 6, I have illustrated an alternative scheme for obtaining negative component values with a compensator which utilizes a tapped resistor winding 88' and a tapped reactor winding 89'. Connected with the taps of resistor winding 88' are two multi-point switches 97 and 98 and connected with the taps of reactor winding 89' are similar multi-point switches 99 and 100.

When the blades of the four switches named occupy the positions illustrated, the resistor and reactor windings 88' and 89' introduce into the energizing circuit of relay winding 65 voltage drops, proportional to line current $I_a$, which are maximum in what may be assumed to be the positive direction. Rotation of the blade of switch 97 in the counter-clockwise direction progressively reduces the magnitude of the positive resistor drop decreasing it to zero when the blade has been advanced to the last tap in this direction. A subsequent rotation in the counter-clockwise direction of the blade of switch 98 reverses the direction of voltage drop through resistor 88' making it negative, the magnitude of this negative potential being increased as the blade of the switch 98 is caused to approach the last tap in the counter-clockwise direction.

In a similar manner, rotation of the blade of switch 99 in a counter-clockwise direction reduces the value of positive voltage drop across the reactor winding 89', it becoming zero when the switch has advanced to the last point in this direction. A subsequent rotation in the counter-clockwise direction of the blade of switch 100 reverses the voltage drop across reactor 89' introduced in the circuit of relay winding 65 making it negative. The value of this negative voltage is progressively increased as the switch is further advanced in the counter-clockwise direction.

It will be apparent that each of the several modifications of compensating device which I have just described is inherently capable of providing compensating components of both positive and negative values without the use of auxiliary connection reversing equipment.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. A device for compensating for the voltage drop in an electrical circuit comprising a resistance element, means for producing a voltage component across said element that varies with the current in said circuit and that is in substantial phase coincidence therewith, and means for adjusting said component through a range which extends below zero to include reversed or negative values of the component.

2. A device for compensating for the voltage drop in an electrical circuit comprising a reactance element, means for producing a voltage component across said element that varies with the current in said circuit and that is displaced substantially 90° from said current, and means for adjusting said component through a range which extends below zero to include reversed or negative values of the component.

3. A device for compensating for the voltage drop in an electrical circuit comprising a resistance element and a reactance element for producing, respectively, a voltage component substantially in phase coincidence with, and a component displaced substantially 90° from, the current in said circuit, and means for adjusting the magnitude of each of said components, said means for adjusting the component produced by the resistance element being disposed to provide an adjustment range that extends below zero to include reversed resistance components displaced substantially 180° from the said circuit current.

4. A device for compensating for the voltage drop in an electrical circuit comprising a resistance element and a reactance element for producing, respectively, a voltage component substantially in phase coincidence with, and a component displaced substantially 90° from, the current in said circuit, and means for adjusting the magnitude of each of said components, said means for adjusting the component produced by the reactance element being disposed to provide an adjustment range that extends below zero to include reversed reactance components displaced from the said circuits current substantially 90° in a direction opposite to that first stated.

5. A device for compensating for the voltage drop in an electrical circuit comprising a resistance element and a reactance element for producing, respectively, a voltage component substantially in phase coincidence with, and a component displaced substantially 90° from, the current in said circuit, and means for adjusting the magnitude of each of said components, the means for adjusting the component produced by said resistance element being disposed to provide an adjustment range that extends below zero to include reversed resistance components displaced substantially 180° from the said circuit current, and the means for adjusting the component produced by said reactance element being disposed to provide an adjustment range that extends below zero to include reversed reactance components displaced from the said circuit current substantially 90° in a direction opposite to that first stated.

6. A device for compensating for the voltage drop in an electrical circuit comprising a core having a substantially closed magnetic circuit, a portion of the core being adapted to move relatively to the other portion, a primary winding disposed on one of the core portions and a secondary winding disposed on the other core portion, a resistor connected in parallel-circuit relation to said secondary winding, and means for so varying the relative positions of the portions of the core that the inductive coupling between the said two windings may be changed through a range which includes a complete reversal of coupling to thereby produce, when the primary winding is energized, corresponding adjustable voltage drops across said resistor.

7. A device for compensating for the ohmic voltage drop in an electrical circuit comprising a core assembly made up of two relatively movable members disposed to provide a substantially closed magnetic circuit, a primary winding carried by one of the members and a secondary winding carried by the other, means for varying the relative positions of the core members in a manner that the inductive coupling of said two windings may be adjusted from a given value in one direction through zero to a given value in the opposite or reverse direction thereby effecting corresponding adjustments of the voltage induced in the secondary winding by the primary winding when energized, and a resistor connected in parallel-circuit relation to said secondary winding.

8. A device for compensating for the voltage drop in an electrical circuit comprising a core having a magnetic circuit which contains an appreciable air gap, a portion of the core being adapted to move relatively to the other portion, a primary winding disposed on one of the core portions and a secondary winding disposed on the other core portion, and means for so varying the relative positions of the core portions that the inductive coupling between the said two windings may be changed through a range including a complete reversal to thereby produce, when the primary winding is energized, corresponding adjustable voltages induced in the secondary winding.

9. A device for compensating for the reactive voltage drop in an electrical circuit comprising a core assembly made up of two relatively movable members disposed to provide a magnetic circuit in which there is a substantial air gap, a primary winding carried by one of the members and a secondary winding carried by the other, and means for varying the relative positions of the core members in a manner that the inductive coupling of said two windings may be adjusted from a given value in one direction through zero to a given value in the opposite or reverse direction, thereby effecting corresponding adjustments in the voltages induced in the secondary winding by the primary winding when energized.

10. A device for compensating for the ohmic and reactive voltage drop in an electrical circuit comprising two core members, one having a substantially negligible air gap in its magnetic circuit and the other having an appreciable air gap therein, each core member comprising two relatively movable portions one of which carries a primary winding and the other of which carries a secondary winding, a resistor connected in parallel-circuit relation to the secondary winding associated with the closed magnetic circuits, and means for shifting the movable portion of each core member in a manner to adjust the magnetic coupling between the two windings associated therewith thereby causing a corresponding adjustment in the voltages induced in the said secondary windings by the primary windings when energized.

11. A device for compensating for the ohmic and reactive voltage drops in an electrical circuit comprising two core members, one having a substantially negligible air gap in its magnetic circuit and the other having an appreciable air gap therein, each core member comprising two relatively movable portions one of which carries a primary winding and the other of which carries a secondary winding, a resistor connected in parallel-circuit relation to the secondary winding associated with the closed magnetic circuits, and means for shifting the movable portion of each core member in a manner that the inductive coupling of said two windings associated with each core member may be adjusted from a given value in one direction through zero to a given value in the opposite or reverse direction, thereby effecting corresponding adjustments in the voltage induced in the secondary winding by the primary winding when energized.

12. A device for compensating for the ohmic voltage drop in an electrical circuit comprising a resistance element in the form of a resistor winding provided with a plurality of tap connections, means for circulating through said winding a current proportional to the current in said circuit, and means, comprising said tap connections for adjusting the voltage drop set up in said resistor winding through a range which extends below zero to include reversed or negative values of the voltage.

13. A device for compensating for the reactive voltage drop in an electrical circuit comprising a reactance element in the form of a reactor winding provided with a plurality of tap connections, means for circulating through said winding a current proportional to the current in said circuit, and means, comprising said tap connections, for adjusting the voltage drop set up in said reactor winding through a range which extends below zero to include reversed or negative values of the voltage.

14. A device for compensating for the ohmic and reactive voltage drops in an electrical circuit comprising a resistance element in the form of a resistor winding provided with a plurality of tap connections and a reactance element in the form of a reactor winding provided with a plurality of tap connections, means for circulating through said windings a current proportional to the current in said circuit, and means, comprising said tap connections, for adjusting the voltage drop set up in said reactor winding through a range which extends below zero to include reversed or negative values of the voltage.

15. In combination with a compensator element comprising a core assembly made up of two relatively movable members one of which carries a primary winding and the other of which carries a secondary winding, the range of movement between the core members including a zero setting at which the inductive coupling between the said two windings is made zero, means for providing an artificial burden for said primary winding which becomes most effective at said zero setting.

16. In combination with a compensator element comprising a core assembly made up of two relatively movable members one of which carries a primary winding and the other of which carries a secondary winding, the range of movement between the core members including a zero setting at which the inductive coupling between the said two windings is made zero, means for providing an artificial burden for said primary winding which becomes most effective at said zero setting, said means comprising a closed-circuited winding carried by the same core member as is the secondary winding and positionally spaced therefrom.

17. In combination with a compensator element comprising a variometer device made up of a stator core member and a rotor core member movably disposed within the stator, a primary winding carried by one of said members and a secondary winding carried by the other, means for providing an artificial burden for said primary winding which is most effective when the position of the rotor with respect to the stator is such that the plane of secondary winding is displaced by 90° from that of the primary winding, said means comprising a closed-circuited winding carried by the same core member as is the secondary winding and positioned with its plane at right angles to the plane of the secondary winding.

18. In a compensator, a variometer device made up of a stator core member and a rotor core member movably disposed within the stator, a primary winding carried by one of the members and a secondary winding carried by the other member in such manner that movement of the rotor changes the position of the planes of the two windings through a range which includes a 90° plane displacement, and a closed-circuited winding carried by the core member on which the secondary winding is disposed, in such position that the plane coincides with that of the primary winding when the plane of the secondary winding is displaced 90° therefrom.

EDWARD R. WOLFERT.